E. F. W. ALEXANDERSON AND S. P. NIXDORFF.
HIGH FREQUENCY ALTERNATOR.
APPLICATION FILED DEC. 6, 1918.

1,366,627.

Patented Jan. 25, 1921.

Inventors:
Ernst F. W. Alexanderson,
Samuel P. Nixdorff,
by Albert G. Davis
Their Attorney.

UNITED STATES PATENT OFFICE.

ERNST F. W. ALEXANDERSON AND SAMUEL P. NIXDORFF, OF SCHENECTADY, NEW YORK, ASSIGNORS TO GENERAL ELECTRIC COMPANY, A CORPORATION OF NEW YORK.

HIGH-FREQUENCY ALTERNATOR.

1,366,627.  Specification of Letters Patent.  Patented Jan. 25, 1921.

Application filed December 6, 1918. Serial No. 265,634.

*To all whom it may concern:*

Be it known that we, ERNST F. W. ALEXANDERSON and SAMUEL P. NIXDORFF, citizens of the United States, residing at Schenectady, in the county of Schenectady, State of New York, have invented certain new and useful Improvements in High-Frequency Alternators, of which the following is a specification.

Our present invention relates to alternators for producing high frequency currents of a frequency suitable for radio communication. The object of our invention is to provide improved means for exciting the field of an alternator of this type.

Alexanderson Patents #1,008,577, November 14, 1911, #1,110,028, September 8, 1914, and #1,110,029, September 8, 1914, describe an inductor type of high frequency alternator which is particularly adapted to be used as the source of current in a continuous wave system of radio communication. This machine comprises a stationary laminated magnetic core carrying an armature winding for the induced high frequency current and a rotor or inductor made in the shape of a disk for maximum strength. The field excitation in this machine is provided by a pair of exciting coils which are concentric with the rotor.

Figure 1:
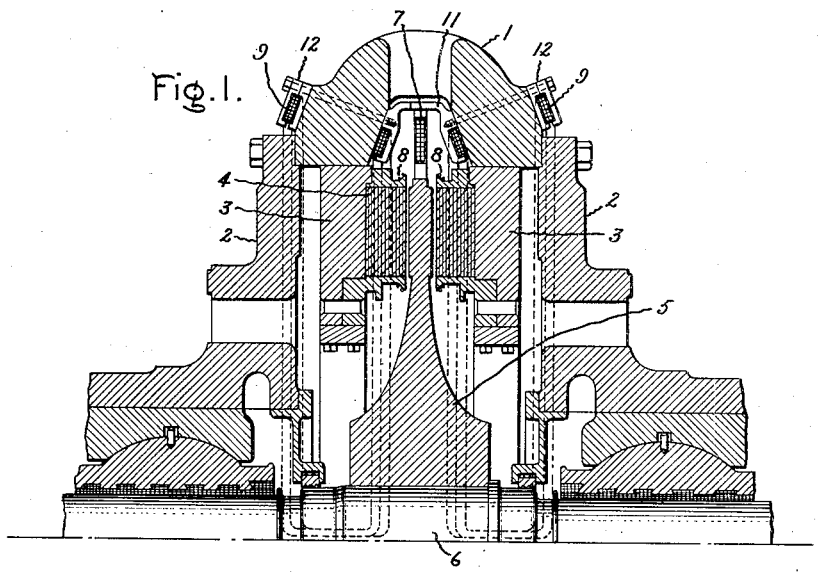
Figure 2:
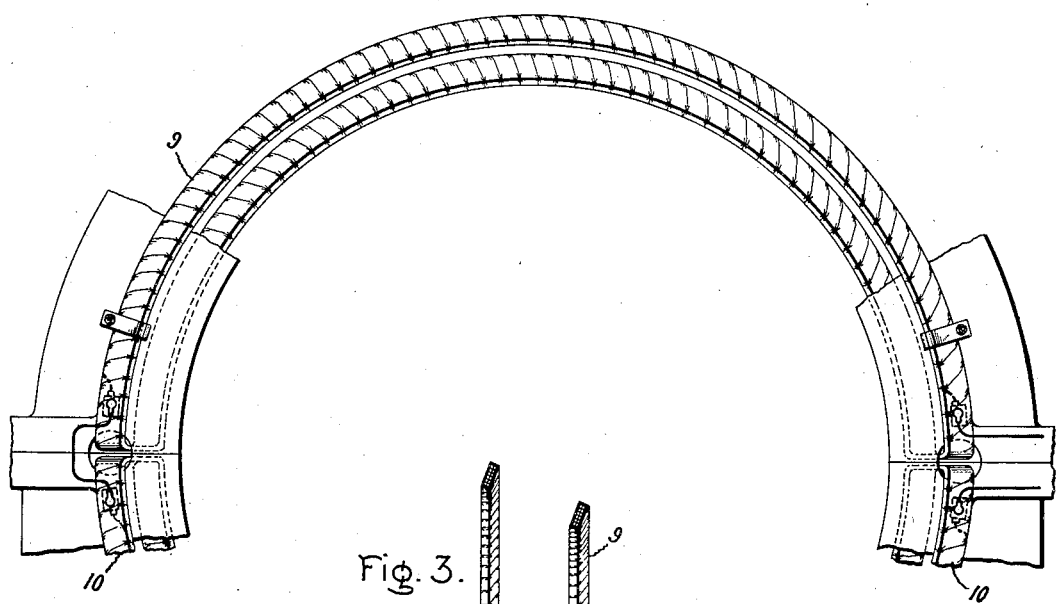
Figure 3:
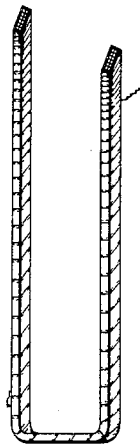

One disadvantage of this construction lies in the fact that in case of injury to the field coils the machine must be entirely dismantled in order to repair or renew the field windings. In such case also the machine must be shut down for repairs as soon as one of the field coils is damaged in any way. In carrying our invention into effect we overcome these disadvantages to a large extent and increase the reliability of operation of the machine. We provide inside of the frame of the machine a single coil concentric with the rotor which has sufficient capacity to furnish the full field excitation required for full load operation of the machine. We also provide two other sets of windings each of which has sufficient capacity to furnish the full field excitation required for full load on the machine and which may be removed without entirely dismantling the machine. The manner in which these extra field windings are applied will best be understood by reference to the following description taken in connection with the accompanying drawing in which Figure 1 is a vertical cross-sectional view of a portion of the machine; Fig. 2 is a perspective of a portion of one of the exciter windings illustrating the manner in which they are applied to the machine and Fig. 3 is a perspective of a portion of one coil.

In the drawings 1 represents the frame of the machine to which are secured the frame heads 2. The frame heads 2 carry end rings 3 which support the laminated field structures 4. A solid magnetic inductor 5 is mounted on a shaft 6 so that its periphery extends between the opposite faces of the field structure 4. A field coil 7 which is concentric with the inductor 5 is secured to the frame 1 and the magnetic circuit of this coil includes the frame 1, the end rings 3, the laminated field structures 4 and the periphery of the inductor 5. The air gaps between the inductor and the laminated field structures lie in radial planes and these air gaps may be adjusted by moving the end rings 3 with respect to the frame heads 2 in a manner not indicated in the drawing. Each side of the periphery of the inductor 5 is provided with radial slots, not shown on the drawing, so that magnetic poles are provided between these slots. These slots are filled with non-magnetic material in order to avoid excessive windage at the high speeds at which the inductor is designed to operate. The armature winding which comprises the coils 8, is carried in slots in the faces of the laminated field structure 4 adjacent the inductor poles.

The field coil 7 is preferably made of such proportions that it will be capable of furnishing continuously the entire field excitation required at full load. In case, however, of injury to this coil the machine would have to be stopped at once and might have to be entirely dismantled in order to repair or renew the field coil. To overcome this disadvantage we provide two additional field windings each of which is alone sufficient to furnish the entire field excitation and which are so arranged that they may more easily be repaired or renewed. These windings are each made up of two semicircular coils 9 and 10 each of which covers half of the periphery of the frame on the inside and the return portions of which are on the outside of the frame as indicated so that each coil embraces the periphery of one half of the frame. These coils are secured to the frame by means of the inner clamp 11 and outer clamps 12, and may be put in place before the machine is assembled. In case of injury to one of the coils secured to the upper half of the frame it will only be necessary to lift the upper half of the frame in order to make the necessary repairs or renewal.

In the normal operation of the machine it may be preferable to excite the field by means of all of the coils 7, 8 and 10. Then in case of injury to any one of the coils all that will be necessary to continue the operation of the machine will be to supply a greater current to the remaining coils. The coils may, of course, be connected in series or in multiple in any combination which may be most convenient. We have indicated in Fig. 2 a series connection between the two coils on one side of the machine. This is merely a matter of convenience, however, as the entire excitation for the machine may be furnished by the upper coil on one side of the machine and the lower coil on the opposite side.

While we have illustrated and described only one embodiment of our invention, we do not wish to be limited to the exact structure shown, as it will be apparent to one skilled in the art that many variations therein may be made without departing from the scope of the appended claims.

What we claim as new and desire to secure by Letters Patent of the United States, is:

1. An alternator of the inductor type having a frame which forms a part of its field structure and means for exciting the field of said alternator comprising a coil of semicircular form embracing the periphery of one-half of said frame.

2. An alternator of the inductor type having a frame which is divided into two semicircular parts and which forms a part of its field structure, and means for exciting the field of said alternator comprising two coils of semicircular form each of which embraces the periphery of one-half of said frame.

3. An alternator of the inductor type having a frame which is divided into two semicircular parts and which forms a part of its field structure and means for exciting the field of said alternator comprising a plurality of semicircular coils embracing the periphery of each half of said frame.

In witness whereof, we have hereunto set our hands this 5th day of December, 1918.

ERNST F. W. ALEXANDERSON.
SAMUEL P. NIXDORFF.